US012746800B2

United States Patent

(12) United States Patent
Yun et al.

(10) Patent No.: US 12,746,800 B2
(45) Date of Patent: Sep. 29, 2026

(54) BUS HEATING SYSTEM AND METHOD OF CONTROLLING THE SAME

(71) Applicants: Hyundai Motor Company, Seoul (KR); Kia Corporation, Seoul (KR)

(72) Inventors: Nam Seok Yun, Hwaseong-si (KR); Wang Hyun Joe, Bucheon-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 1080 days.

(21) Appl. No.: 17/728,821

(22) Filed: Apr. 25, 2022

(65) Prior Publication Data

US 2023/0064579 A1 Mar. 2, 2023

(30) Foreign Application Priority Data

Aug. 26, 2021 (KR) ........................ 10-2021-0113502

(51) Int. Cl.
*B60H 1/22* (2006.01)
*B60H 1/00* (2006.01)

(52) U.S. Cl.
CPC ....... *B60H 1/2218* (2013.01); *B60H 1/00371* (2013.01); *B60H 1/00735* (2013.01)

(58) Field of Classification Search
CPC .............. B60H 1/00807; B60H 1/2218; B60H 2001/00221; B60H 2001/00235; B60H 2001/00942; H04L 2012/40273
See application file for complete search history.

(56) References Cited

U.S. PATENT DOCUMENTS 4,034,570 A * 7/1977 Anderson ............... F25B 49/02 62/215
6,012,294 A 1/2000 Utsumi
(Continued)

FOREIGN PATENT DOCUMENTS

CN 102085788 A 6/2011
CN 111032386 A 4/2020
(Continued)

*Primary Examiner* — Justin C Dodson
*Assistant Examiner* — Hamzeh Hicham Amin
(74) *Attorney, Agent, or Firm* — MORGAN, LEWIS & BOCKIUS LLP

(57) ABSTRACT

A bus heating system and a method of controlling the same, is configured for controlling a water-heating-type main heater unit and a heat-pump-type auxiliary heater unit in conjunction with each other for heating an interior of a bus, improving the efficiency of operation of the main heater unit while reducing the number of switch operations. The bus heating system includes a water-heating-type main heater unit configured to heat an internal bottom area of the bus, a heat-pump-type auxiliary heater unit configured to heat an internal roof area of the bus, and a controller configured to control operations of the main heater unit and the auxiliary heater unit in conjunction with each other based on a set target internal temperature ($T_{target}$), a measured outside air temperature ($T_{outside}$), a measured internal temperature ($T_{room}$), and a main-heater-unit refrigerant temperature ($T_{refrigerants}$).

11 Claims, 3 Drawing Sheets

(56) References Cited

U.S. PATENT DOCUMENTS

| | | | | |
|---|---|---|---|---|
| 6,118,099 | A * | 9/2000 | Lake .................... | B60H 1/2218<br>219/202 |
| 6,314,380 | B1 | 11/2001 | Seip et al. | |
| 8,919,140 | B2 * | 12/2014 | Johnson ............. | B60H 1/00378<br>62/133 |
| 2010/0201507 | A1 * | 8/2010 | Rao ......................... | B60R 11/04<br>348/148 |
| 2010/0307178 | A1 | 12/2010 | Hansen et al. | |
| 2014/0209269 | A1 * | 7/2014 | Goenka ............. | B60H 1/32281<br>165/42 |
| 2018/0170144 | A1 | 6/2018 | Yang et al. | |

FOREIGN PATENT DOCUMENTS

| | | | |
|---|---|---|---|
| JP | 1992-243619 | | 8/1992 |
| JP | H04243619 | A * | 8/1992 |
| JP | H08-310227 | A | 11/1996 |
| JP | 2001-001749 | | 1/2001 |
| JP | 2012-0046163 | | 3/2012 |
| KR | 10-2000-0021312 | | 4/2000 |
| KR | 10-0954015 | | 4/2010 |
| KR | 10-2014-0097994 | | 8/2014 |
| KR | 10-1784475 | | 10/2017 |

* cited by examiner

BUS HEATING SYSTEM AND METHOD OF CONTROLLING THE SAME

CROSS-REFERENCE TO THE RELATED APPLICATION

The present application claims priority to Korean Patent Application No. 10-2021-0113502, filed on Aug. 26, 2021, the entire contents of which is incorporated herein for all purposes by this reference.

BACKGROUND OF THE PRESENT DISCLOSURE

Field of the Present Disclosure

The present disclosure relates to a bus heating system and a method of controlling the same, and more particularly, to a bus heating system and a method of controlling the same, which are capable of controlling a water-heating-type main heater unit and a heat-pump-type auxiliary heater unit in conjunction with each other for heating an interior of a bus, improving the efficiency of operation of the main heater unit while reducing the number of switch operations.

Description of Related Art

A typical conventional vehicle is driven using power generated by an internal combustion engine as a power source, and utilizes a heat-pump-type heating/cooling system applied for heating and cooling the interior of the vehicle.

With the rise of environmental issues in recent years, there is a growing demand for environment-friendly vehicles. As a representative environment-friendly vehicle, an electric vehicle, which is driven by a motor using electricity as a power source, has been commercially released.

Because such an electric vehicle is provided with high-capacity batteries, it utilizes a water-heating-type heating system to rapidly heat the interior of the vehicle.

In the case of a vehicle with a large internal space, such as a bus, a heat-pump-type heating/cooling system and a water-heating-type heating system are applied and used together.

A conventional bus includes, in terms of structure, a main heater unit provided on the internal floor thereof to perform heating by water heating, and an auxiliary heater unit provided on the ceiling thereof to perform heating by heat pumping. In the instant case, the auxiliary heater unit performs heating, and is also configured for functioning as an air conditioner that performs cooling by heat pumping.

Because the main heater unit and the auxiliary heater unit are mounted at different positions, they are operated using separate heat exchangers and thus controlled individually by separate controllers respectively provided thereto.

Meanwhile, to improve the fuel efficiency of the vehicle in the winter season, it is necessary to increase the time of use of the auxiliary heater unit operated by heat pumping, rather than that of the main heater unit operated by water heating. However, it is difficult to expect an improvement in fuel efficiency while maintaining the internal temperature at a desired temperature because a driver is capable of freely operating the main heater unit and the auxiliary heater unit.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a bus heating system and a method of controlling the same, which are configured for controlling a water-heating-type main heater unit and a heat-pump-type auxiliary heater unit in conjunction with each other for heating an interior of a bus, improving the efficiency of operation of the main heater unit while reducing the number of switch operations.

In accordance with an aspect of the present disclosure, the above and other objects may be accomplished by the provision of a system for heating an interior of a bus, which includes a water-heating-type main heater unit configured to heat an internal bottom area of the bus, a heat-pump-type auxiliary heater unit configured to heat an internal roof area of the bus, and a controller configured to control operations of the main heater unit and the auxiliary heater unit in conjunction with each other based on a set target internal temperature ($T_{target}$), a measured outside air temperature ($T_{outside}$), a measured internal temperature ($T_{room}$), and a main-heater-unit refrigerant temperature ($T_{refrigerants}$).

When the interior of the bus starts to be heated, the controller may cause a first mode to be implemented in which the main heater unit is turned on and the target internal temperature ($T_{target}$) is compared with the measured internal temperature ($T_{room}$) based on the measured outside air temperature ($T_{outside}$) to control whether to operate the auxiliary heater unit.

When a relationship between the target internal temperature (Ttarget) and the measured internal temperature (Troom) satisfies $T_{room}=T_{target}-X°$ C., where the X is between 3 and 8, based on the measured outside air temperature ($T_{outside}$) in the first mode, the controller may cause the auxiliary heater unit to be turned on.

Here, X may be smaller as the measured outside air temperature ($T_{outside}$) is lower.

The controller may cause a second mode to be implemented in which the main heater unit is turned off when the measured internal temperature (Troom) reaches the target internal temperature ($T_{target}$)+$\alpha°$ C. in a state where the main heater unit and the auxiliary heater unit are ON in the first mode.

The controller may cause a third mode to be implemented in which the auxiliary heater unit is turned off when the measured internal temperature ($T_{room}$) reaches the target internal temperature ($T_{target}$)+$\beta°$ C. in the second mode, and the auxiliary heater unit is turned on when the measured internal temperature ($T_{room}$) reaches the target internal temperature ($T_{target}$)+$\alpha°$ C. in the state where the auxiliary heater unit is OFF (where $\alpha<\beta$).

The controller may cause ON and OFF operations of the auxiliary heater unit to be alternately repeated while the measured internal temperature ($T_{room}$) is maintained within a predetermined range in response to a condition of the measured internal temperature ($T_{room}$) and the target internal temperature ($T_{target}$) in the third mode.

The controller may cause a fourth mode to be implemented in which the main heater unit is turned on when the main-heater-unit refrigerant temperature ($T_{refrigerants}$) is 30° C. or less in the third mode, and the main heater unit is turned off when the main-heater-unit refrigerant temperature ($T_{refrigerants}$) is 40° C. or higher in the state where the main heater unit is ON.

The controller may cause ON and OFF operations of the main heater unit to be alternately repeated while the main-heater-unit refrigerant temperature ($T_{refrigerants}$) is maintained within a predetermined range in response to the main-heater-unit refrigerant temperature ($T_{refrigerants}$) in the fourth mode.

The controller may be configured to control the second mode to be implemented only once for a first time.

The controller may include a CCM configured to control the operation of the auxiliary heater unit while controlling the operation of the main heater unit, and an ACP configured to subordinately control the operation of the auxiliary heater unit in conjunction with the control of the operation of the auxiliary heater unit by the CCM.

The CCM and the ACP may share a signal through a CAN.

The system may further include a sensing unit connected to the controller and configured to send the measured outside air temperature ($T_{outside}$), the measured internal temperature ($T_{room}$), and the main-heater-unit refrigerant temperature ($T_{refrigerants}$), which are measured by the sensing unit, to the controller.

In accordance with another aspect of the present disclosure, there is provided a method of heating an interior of a bus by controlling a water-heating-type main heater unit configured to heat an internal bottom area of the bus and a heat-pump-type auxiliary heater unit configured to heat an internal roof area of the bus. The method includes starting to heat the interior of the bus, and controlling operations of the main heater unit and the auxiliary heater unit in conjunction with each other based on a set target internal temperature ($T_{target}$), a measured outside air temperature ($T_{outside}$), a measured internal temperature ($T_{room}$), and a main-heater-unit refrigerant temperature ($T_{refrigerants}$).

The controlling operations of the main heater unit and the auxiliary heater unit may include implementing a first mode in which the main heater unit is turned on and the target internal temperature ($T_{target}$) is compared with the measured internal temperature ($T_{room}$) based on the measured outside air temperature ($T_{outside}$) to control whether to operate the auxiliary heater unit, implementing a second mode in which the main heater unit is turned off when the measured internal temperature ($T_{room}$) reaches the target internal temperature ($T_{target}$)+α° C. in a state where the main heater unit and the auxiliary heater unit are ON in the first mode, implementing a third mode in which the auxiliary heater unit is turned off when the measured internal temperature ($T_{room}$) reaches the target internal temperature ($T_{target}$)+β° C. in the second mode, and the auxiliary heater unit is turned on when the measured internal temperature ($T_{room}$) reaches the target internal temperature ($T_{target}$)+α° C. in the state where the auxiliary heater unit is OFF (where $\alpha<\beta$), and implementing a fourth mode in which the main heater unit is turned on when the main-heater-unit refrigerant temperature ($T_{refrigerants}$) is 30° C. or less in the third mode, and the main heater unit is turned off when the main-heater-unit refrigerant temperature ($T_{refrigerants}$) is 40° C. or higher in the state where the main heater unit is ON.

In the first mode, when a relationship between the target internal temperature (Ttarget) and the measured internal temperature (Troom) satisfies $T_{room}=T_{target}-X°$ C. (X=3~8) based on the measured outside air temperature ($T_{outside}$), the auxiliary heater unit may be turned on.

Here, X may be smaller as the measured outside air temperature ($T_{outside}$) is lower.

The fourth mode may be implemented in which the main heater unit is turned on when the main-heater-unit refrigerant temperature ($T_{refrigerants}$) is 30° C. or less in the third mode, and the main heater unit is turned off when the main-heater-unit refrigerant temperature ($T_{refrigerants}$) is 40° C. or higher in the state where the main heater unit is ON.

The second mode may be implemented only once for a first time. In the third mode, ON and OFF operations of the auxiliary heater unit may be alternately repeated while the measured internal temperature ($T_{room}$) is maintained within a predetermined range in response to a condition of the measured internal temperature ($T_{room}$) and the target internal temperature ($T_{target}$). In the fourth mode, ON and OFF operations of the main heater unit may be alternately repeated while the main-heater-unit refrigerant temperature ($T_{refrigerants}$) is maintained within a predetermined range in response to the main-heater-unit refrigerant temperature ($T_{refrigerants}$).

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
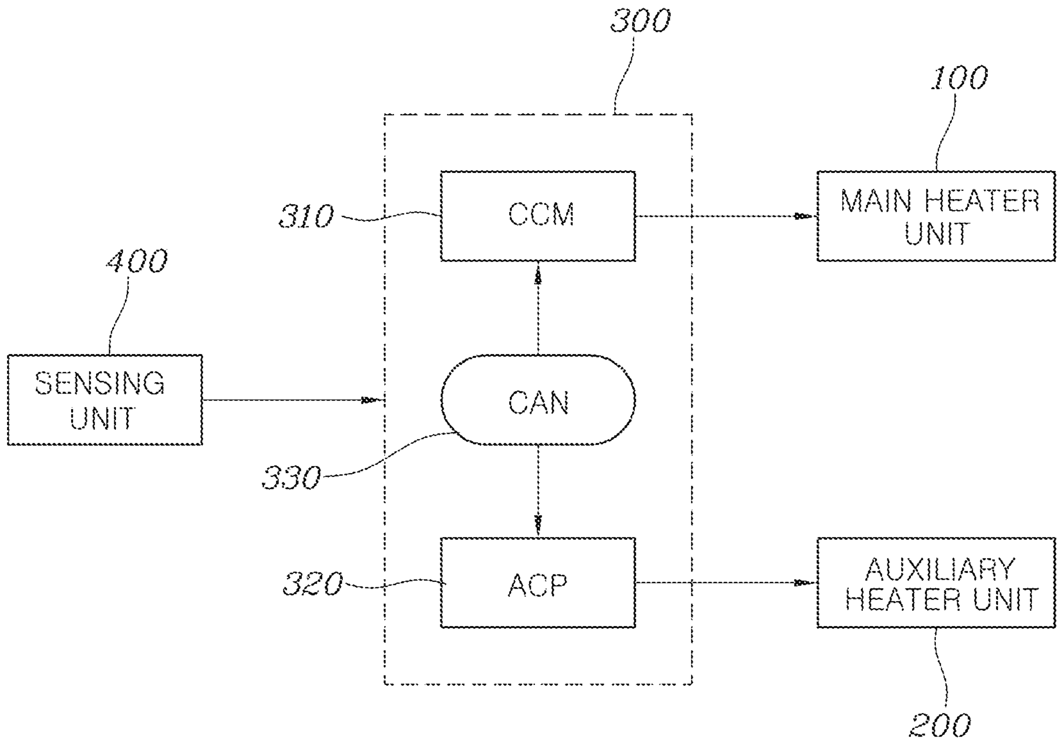
FIG. 1 is a diagram illustrating a configuration of a bus heating system according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described below in more detail with reference to the accompanying drawings. The present disclosure may, however, be embodied in different forms, and should not be construed as being limited to the exemplary embodiments set forth herein. Rather, these embodiments are provided so that the present disclosure will be thorough and complete, and will fully convey the scope of the present disclosure to those skilled in the art. In the drawings, like reference numerals refer to like elements.

FIG. 1 is a diagram illustrating a configuration of a bus heating system according to various exemplary embodiments of the present disclosure.

The bus heating system according to the exemplary embodiment of the present disclosure is a system for heating the interior of a bus. In the present exemplary embodiment of the present disclosure, a heating system for electric buses will be referred to as an example. Of course, the bus heating system according to an exemplary embodiment of the present disclosure is not limited in application to an electric bus, but may be applied to a hydrogen bus using electricity generated by fuel cells as a power source or a typical bus using power generated by an internal combustion engine as a power source.

As illustrated in FIG. 1, the bus heating system according to the exemplary embodiment of the present disclosure includes a water-heating-type main heater unit 100 configured to heat an internal bottom area of a bus, a heat-pump-type auxiliary heater unit 200 configured to heat an internal roof area of the bus, and a controller configured to control operations of the main heater unit 100 and the auxiliary heater unit 200 in conjunction with each other based on a set target internal temperature ($T_{target}$), a measured outside air temperature ($T_{outside}$), a measured internal temperature ($T_{room}$), and a main-heater-unit refrigerant temperature ($T_{refrigerants}$).

The bus heating system further includes a sensing unit 400 configured to measure an outside air temperature to obtain the measured outside air temperature ($T_{outside}$), to measure an internal temperature of the bus to obtain the measured internal temperature ($T_{room}$), and to measure a refrigerant temperature to obtain the measured refrigerant temperature ($T_{refrigerants}$). The sensing unit 400 also sends the above measured temperatures to the controller 300.

The main heater unit 100 is a water-heating-type means for heating the internal bottom area of the bus, and includes a heating facility using a typical water-heating-type heater applied thereto.

For example, the main heater unit 100 includes a water-heating-type heater configured to heat a refrigerant upon supply of power thereto, a passage through which the refrigerant heated by the water-heating-type heater flows, and a plurality of heaters provided on the passage to transfer the heat of the heated refrigerant to the internal bottom area of the bus. In the instant case, the water-heating-type heater may be provided as a single water-heating heater or as a plurality of water-heating-type heaters on the passage as needed. Furthermore, the main heater unit may be provided as a single main heater unit or as a plurality of main heater units in the bottom area of the bus as needed. of course, when a plurality of water-heating-type heaters are provided and when a plurality of main heater units is provided, it is preferable to simultaneously control individual water-heating-type heaters in conjunction with each other.

The auxiliary heater unit 200 is a heat-pump-type means for heating the internal roof area of the bus, and includes a heating facility using a typical heat pump structure applied thereto. In the instant case, the auxiliary heater unit performs heating, and at the same time functions as an air conditioner that performs cooling by heat pumping.

For example, the auxiliary heater unit 200 has a heat pump structure that includes a compressor, a condenser, an expansion valve, and an evaporator to utilize heat dissipation in the condenser and heat absorption in the evaporator during circulation of the refrigerant.

The controller 300 is configured for controlling the operations of the main heater unit and the auxiliary heater unit in conjunction with each other in response to various conditions. The controller 300 includes a comfort control module (CCM) 310 that controls the operation of the auxiliary heater unit 200 while controlling the operation of the main heater unit 100, and an advanced control platform (ACP) 320 that subordinately controls the operation of the auxiliary heater unit 200 in conjunction with the control of the operation of the auxiliary heater unit 200 by the CCM 310.

In the instant case, the CCM 310 and the ACP 320 share a signal through a controller area network (CAN) 330 provided in the bus.

The controller 300 controls the operations of the main heater unit 100 and the auxiliary heater unit 200 in conjunction with each other based on the set target internal temperature ($T_{target}$), the measured outside air temperature ($T_{outside}$), the measured internal temperature ($T_{room}$), and the main-heater-unit refrigerant temperature ($T_{refrigerants}$).

The sensing unit 400 may be provided with and use different types of temperature detectors, which measure the outside air temperature and the internal temperature of the bus in real time and are provided on the passage, through which the refrigerant circulates in the main heater unit, to measure the temperature of the refrigerant that has passed through the water-heating-type heater in real time. The sensing unit 400 includes at least one temperature detector for measuring the external temperature, at least one temperature detector for measuring the internal temperature, and at least one temperature detector for measuring the temperature of the refrigerant circulated in the main heater unit, and sends the temperature value measured in real time by each of the temperature detectors to the controller 300.

Accordingly, the controller 300 controls the operations of the main heater unit 100 and the auxiliary heater unit 200 in conjunction with each other by comparing the set target internal temperature ($T_{target}$) with the measured outside air temperature ($T_{outside}$), the measured internal temperature ($T_{room}$), and the main-heater-unit refrigerant temperature ($T_{refrigerants}$) provided thereto.

A method of controlling the bus heating system having the above-mentioned configuration according to the exemplary embodiment of the present disclosure will be described. The control method to be described below is based on the control logic executed by the constituent controller 300 of the bus heating system.

Figure 2:
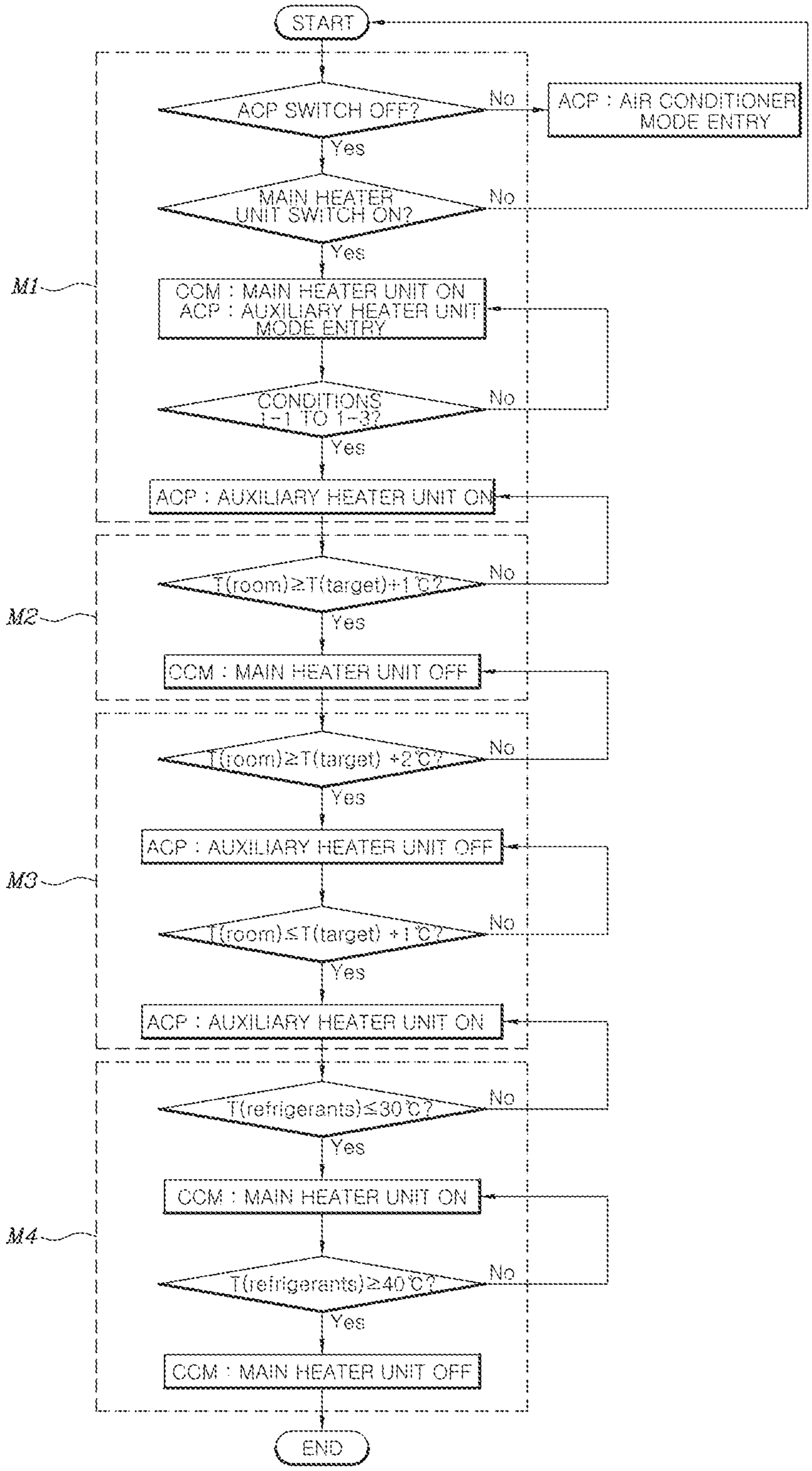
FIG. 2 is a flowchart illustrating a method of controlling a bus heating system according to various exemplary embodiments of the present disclosure.

FIG. 2 is a flowchart illustrating a method of controlling a bus heating system according to various exemplary embodiments of the present disclosure.

As illustrated in FIG. 2, the method of controlling a bus heating system according to the exemplary embodiment of the present disclosure broadly includes a step of starting to heat the interior of the bus, and a step of controlling the operations of the main heater unit 100 and the auxiliary heater unit 200 in conjunction with each other based on the set target internal temperature ($T_{target}$), the measured outside air temperature ($T_{outside}$), the measured internal temperature ($T_{room}$), and the main-heater-unit refrigerant temperature ($T_{refrigerants}$).

The start step is a step in which the driver of the bus operates the controller 300 to heat the interior of the bus. For example, the driver starts heating with the main heater unit 100 and the auxiliary heater unit 200 turned off.

Accordingly, the driver checks that the ACP 320 is turned off in a control panel provided for operation of the main heater unit 100, sets a target internal temperature ($T_{target}$), and then turns on a switch for operating the main heater unit 100.

Accordingly, the controller 300 causes a first mode M1 to be implemented. At the instant time, when the driver turns on the ACP 320, it is determined that the auxiliary heater unit 200 is used to cool the internal regardless of the measured outside air temperature ($T_{outside}$), so that the process enters a cooling mode by the auxiliary heater unit 200.

If the driver keeps the ACP 320 off rather than turning it on, it is determined that the internal is heated regardless of the measured outside air temperature ($T_{outside}$), so that the main heater unit is operated and the auxiliary heater unit 200 enters a heating mode to be ready for execution.

In the present way, when the main heater unit 100 is operated and the auxiliary heater unit 200 enters the heating mode to be ready for execution, the measured internal temperature ($T_{room}$) follows the target internal temperature ($T_{target}$) to be gradually increased by the operation of the main heater unit 100.

In the instant case, the target internal temperature ($T_{target}$) is compared with the increased measured internal temperature ($T_{room}$) based on the measured outside air temperature ($T_{outside}$) to determine whether to operate the auxiliary heater unit 200.

Preferably, in the first mode M1, when a relationship between the target internal temperature ($T_{target}$) and the measured internal temperature ($T_{room}$) satisfies $T_{room}=T_{target}-X°$ C. (where X=3~8) based on the measured outside air temperature ($T_{outside}$), the ACP 320 turns on the auxiliary heater unit. The value of the X is smaller as the measured outside air temperature ($T_{outside}$) is lower.

For example, in the first mode M1, when a relationship between the target internal temperature ($T_{target}$) and the measured internal temperature ($T_{room}$) satisfies any one of the following conditions 1-1 to 1-3 based on the measured outside air temperature ($T_{outside}$), the ACP 320 turns on the auxiliary heater unit:

in the case of (Condition 1-1) $T_{outside}$: 17.5~10° C., $T_{room}=T_{target}-8°$ C.;

in the case of (Condition 1-2) $T_{outside}$: 10~5° C., $T_{room}=T_{target}-5°$ C.; and in the case of (Condition 1-3) $T_{outside}$: 5~−10° C., $T_{room}=T_{target}-3°$ C.

In the present way, in the first mode M1, the main heater unit 100 and the auxiliary heater unit 200 are simultaneously operated so that the measured internal temperature ($T_{room}$) is gradually increased to the target internal temperature ($T_{target}$) or higher.

Accordingly, when the main heater unit 100 and the auxiliary heater unit 200 are operated so that the measured internal temperature ($T_{room}$) is increased to reach a predetermined temperature in the first mode M1, the process enters a second mode M2 in which the main heater unit 100 is turned off.

For example, in the second mode M2, when the measured internal temperature ($T_{room}$) is determined to reach the target internal temperature ($T_{target}$)+α° C. by comparing the measured internal temperature ($T_{room}$) with the target internal temperature ($T_{target}$), main heater unit 100 is turned off. Accordingly, the internal heating is performed only by the auxiliary heater unit 200, so that the internal temperature is maintained or the rate at which the internal temperature is increased is reduced. For example, it is preferable to set α so that the measured internal temperature ($T_{room}$) is slightly higher than the target internal temperature ($T_{target}$). Therefore, a is a real number including a positive real number (+) value; for example, α=1 may be applied.

In the instant case, the second mode M2 is implemented only once for a first time.

In the present way, the process enters a third mode M3 in which the internal temperature is maintained within a predetermined temperature range by comparing the measured internal temperature ($T_{room}$) with the target internal temperature ($T_{target}$) to control the operation of the auxiliary heater unit 200 in the state in which the second mode M2 is implemented.

For example, in the third mode M3, when the measured internal temperature ($T_{room}$) reaches the target internal temperature ($T_{target}$)+β° C., the auxiliary heater 200 is turned off. Thus, it is possible to prevent the measured internal temperature ($T_{room}$) from increasing further. For example, β be a temperature higher than α within an extent that bus passengers do not feel discomfort due to the change in temperature. B is a real number, and for example, β=2 may be applied.

In the present way, since both the main heater unit 100 and the auxiliary heater unit 200 are kept OFF, the measured internal temperature ($T_{room}$) is gradually decreased.

Therefore, when the measured internal temperature ($T_{room}$) reaches the target internal temperature ($T_{target}$)+α° C. in the state in which the main heater unit 100 and the auxiliary heater unit 200 are turned off, the auxiliary heater unit is turned on again to maintain or gradually increase the internal temperature.

In the present way, in the third mode M3, ON and OFF operations of the auxiliary heater unit are alternately repeated to maintain the measured internal temperature ($T_{room}$) within a predetermined range.

Although the measured internal temperature ($T_{room}$) is maintained within a predetermined range while the third mode M3 is maintained active, the temperature of the refrigerant circulated in the main heater unit 100 may be lowered because the main heater unit 100 is kept OFF. Hence, the internal bottom area of the bus may be lower than the internal roof area of the bus in temperature. In the instant case, passengers may feel discomfort such as their feet being cold. Accordingly, a fourth mode M4 is implemented in which the operation of the main heater unit 100 is controlled in response to the temperature of the refrigerant circulated in the main heater unit 100 to eliminate the discomfort The fourth mode M4 is a mode in which the main heater unit 100 is operated in response to the main-heater-unit refrigerant temperature ($T_{refrigerants}$). For example, when the main-heater-unit refrigerant temperature ($T_{refrigerants}$) is 30° C. or less, the main heater unit 100 is turned on. Thus, it is possible to eliminate discomfort that passengers feel cold in their feet by heating the internal bottom area of the bus using the main heater unit 100.

When the main heater unit 100 is operated so that the main-heater-unit refrigerant temperature ($T_{refrigerants}$) is increased to 40° C. or higher, the main heater unit 100 is turned off to prevent the internal bottom area of the bus from being heated to a relatively high temperature.

As in the third mode M3, in the fourth mode M4, ON and OFF operations of the main heater unit 100 are alternately repeated to maintain the temperature of the refrigerant circulated in the main heater unit 100 within a predetermined range.

In the present way, in the third and fourth modes M3 and M4, ON and OFF operations of the auxiliary heater unit 200 and the main heater unit 100 may be alternately repeated to maintain the measured internal temperature ($T_{room}$) and the main-heater-unit refrigerant temperature ($T_{refrigerants}$) in the interior of the bus within a predetermined range.

Furthermore, because intermittent ON and OFF operations of the auxiliary heater unit 200 and the main heater unit 100 are alternately repeated without individual operation by the driver, it is possible to reduce driver's fatigue and to improve the efficiency of operation of the auxiliary heater unit 200 and the main heater unit 100.

Next, an example to which the bus heating system and the method of controlling the same according to an exemplary embodiment of the present disclosure are applied is compared with a comparative example to which the conventional bus heating system and the method of controlling the same.

Figure 3A:
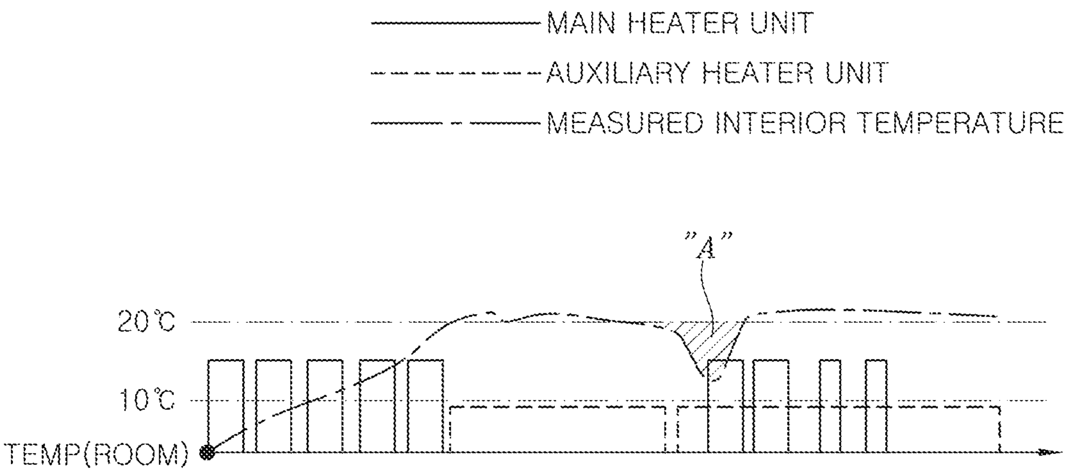
FIG. 3A and FIG. 3B are graphs illustrating a change in measured internal temperature in a bus operated by the bus heating system according to a comparative example and an example of the present disclosure.
Figure 3B:
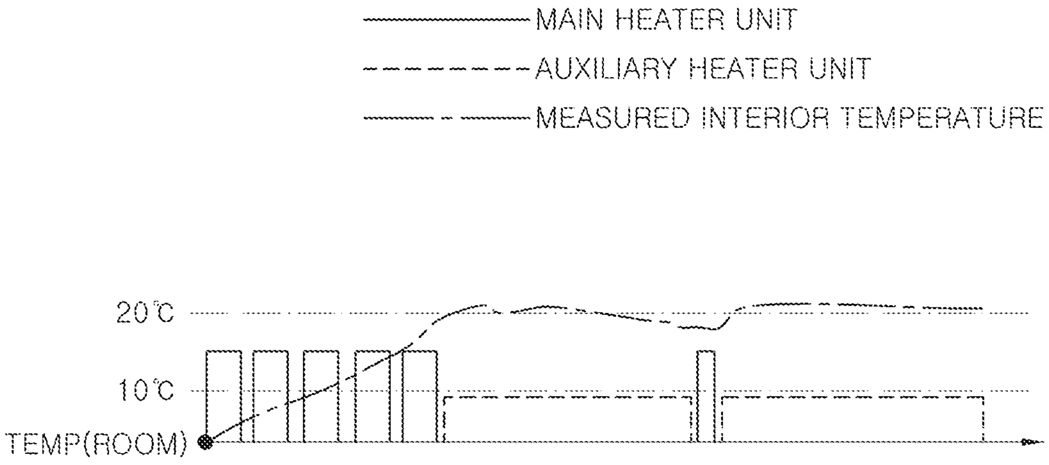

FIG. 3A and FIG. 3B are graphs illustrating a change in measured internal temperature in the bus operated by the bus heating system according to the comparative example and the example of the present disclosure. FIG. 3A is a graph for the comparative example, and FIG. 3B is a graph for the example.

The target internal temperature ($T_{target}$) is set to 20° C. in both the comparative example and the example. In the comparative example, the driver individually controls whether to operate the main heater unit and the auxiliary heater unit depending on the situation. In the example, the controller is configured to control whether to operate the main heater unit and the auxiliary heater unit according to the method of controlling the present disclosure.

As may be seen from FIG. 3A, in the comparative example, since the driver individually controls whether to operate the main heater unit and the auxiliary heater unit, the internal temperature of the bus may be maintained at the target internal temperature ($T_{target}$) of 20° C., but a section such as section "A" occurs in which the measured internal temperature ($T_{room}$) is rapidly decreased while the main heater unit is kept OFF for a long time. Hence, in the section where the measured internal temperature ($T_{room}$) is rapidly decreased, passengers may feel discomfort. Because the internal bottom area of the bus is clearly decreased in temperature, passengers may feel discomfort such as their feet being cold.

On the other hand, as may be seen from FIG. 3B, in the example of the present disclosure, because the controller is configured to control the main heater unit and the auxiliary heater unit in conjunction with each other, the internal temperature of the bus may be maintained at the target internal temperature ($T_{target}$) of 20° C. and a section such as section "A" of the comparative example does not occur in which the measured internal temperature ($T_{room}$) is rapidly decreased.

Meanwhile, the controller according to the exemplary embodiment of the present disclosure may be implemented through a processor configured to perform the operations described herein using an algorithm configured to control the operation of various components of the vehicle or a nonvolatile memory configured to store data relating to software instructions for reproducing the algorithm and data stored in that memory. Here, the memory and the processor may be implemented as separate chips. Alternatively, the memory and the processor may be integrated with each other and implemented as a single chip. The processor may take the form of one or more processors.

As is apparent from the above description, according to the exemplary embodiments of the present disclosure, it is possible to reduce driver's fatigue while reducing the number of times the driver operates the system, by controlling the water-heating-type main heater unit and the heat-pump-type auxiliary heater unit in conjunction with each other.

Furthermore, because the water-heating-type main heater unit and the heat-pump-type auxiliary heater unit are controlled in conjunction with each other in response to the conditions, it is possible to improve the fuel efficiency of the vehicle and thus to save energy for heating.

Furthermore, it is possible to provide improved comfort for passengers by controlling the main heater unit of heating the internal bottom area of the bus and the auxiliary heater unit of heating the internal roof area of the bus in conjunction with each other.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for heating an interior of a vehicle, the system comprising:

a main heater unit configured to heat an internal bottom area of the vehicle;

an auxiliary heater unit configured to heat an internal roof area of the vehicle; and a controller configured to control operations of the main heater unit and the auxiliary heater unit in conjunction with each other based on a set target internal temperature ($T_{target}$), a measured outside air temperature ($T_{outside}$), a measured internal temperature ($T_{room}$), and a main-heater-unit refrigerant temperature ($T_{refrigerants}$), wherein the controller comprises:

a first processor configured to control the operation of the auxiliary heater unit while controlling the operation of the main heater unit; and a second processor configured to subordinately control the operation of the auxiliary heater unit in conjunction with the control of the operation of the auxiliary heater unit by the first processor, wherein when the interior of the vehicle starts to be heated, the controller is configured to implement a first mode in which the main heater unit is turned on and the target internal temperature (Ttarget) is compared with the measured internal temperature (Troom) based on the measured outside air temperature (Toutside) to control whether to operate the auxiliary heater unit, wherein the controller is configured to implement a second mode in which the main heater unit is turned off when the measured internal temperature (Troom) reaches the target internal temperature (Ttarget)+α° C. in a state where the main heater unit and the auxiliary heater unit are ON in the first mode, wherein the α is a real number, and wherein the controller is configured to implement the second mode only once for a first time.

2. The system of claim 1, wherein, when a relationship between the target internal temperature ($T_{target}$) and the measured internal temperature ($T_{room}$) satisfies $T_{room}=T_{target}-X°$ C., where the X is between 3 and 8, based on the measured outside air temperature ($T_{outside}$) in the first mode, the controller is configured to cause the auxiliary heater unit to be turned on.

3. The system of claim 1, wherein the controller is configured to implement a third mode in which the auxiliary heater unit is turned off when the measured internal temperature ($T_{room}$) reaches the target internal temperature ($T_{target}$)+β° C. in the second mode, and the auxiliary heater unit is turned on when the measured internal temperature ($T_{room}$) reaches the target internal temperature ($T_{target}$)+α° C. in a state where the auxiliary heater unit is OFF where the α is smaller than the β, wherein the α and the β are real numbers.

4. The system of claim 3, wherein the controller is configured to cause ON and OFF operations of the auxiliary heater unit to be alternately repeated while the measured internal temperature ($T_{room}$) is maintained within a predetermined range in response to a condition of the measured internal temperature ($T_{room}$) and the target internal temperature ($T_{target}$) in the third mode.

5. The system of claim 4, wherein the controller is configured to implement a fourth mode in which the main heater unit is turned on when the main-heater-unit refrigerant temperature ($T_{refrigerants}$) is 30° C. or less in the third mode, and the main heater unit is turned off when the main-heater-unit refrigerant temperature ($T_{refrigerants}$) is 40° C. or higher in a state where the main heater unit is ON.

6. The system of claim 5, wherein the controller is configured to cause ON and OFF operations of the main heater unit to be alternately repeated while the main-heater-unit refrigerant temperature ($T_{refrigerants}$) is maintained within a predetermined range in response to the main-heater-unit refrigerant temperature ($T_{refrigerants}$) in the fourth mode.

7. The system of claim 1, wherein the first processor and the second processor share a signal through a controller area network (CAN).

8. The system of claim 1, further including a sensing unit connected to the controller and configured to send the measured outside air temperature ($T_{outside}$), the measured internal temperature ($T_{room}$), and the main-heater-unit refrigerant temperature ($T_{refrigerants}$), which are measured by the sensing unit, to the controller.

9. A method of heating an interior of a vehicle by controlling a main heater unit configured to heat an internal bottom area of the vehicle and an auxiliary heater unit configured to heat an internal roof area of the vehicle, the method comprising:

starting to heat the interior of the vehicle; and controlling, by a controller, operations of the main heater unit and the auxiliary heater unit in conjunction with each other based on a set target internal temperature ($T_{target}$), a measured outside air temperature ($T_{outside}$), a measured internal temperature ($T_{room}$), and a main-heater-unit refrigerant temperature ($T_{refrigerants}$), wherein the controlling operations of the main heater unit and the auxiliary heater unit includes:

implementing a first mode in which the main heater unit is turned on and the target internal temperature ($T_{target}$) is compared with the measured internal temperature ($T_{room}$) based on the measured outside air temperature ($T_{outside}$) to control whether to operate the auxiliary heater unit;

implementing a second mode in which the main heater unit is turned off when the measured internal temperature ($T_{room}$) reaches the target internal temperature ($T_{target}$)+α° C. in a state where the main heater unit and the auxiliary heater unit are ON in the first mode, wherein the α is a real number, wherein the second mode is implemented by the controller only once for a first time;

implementing a third mode in which the auxiliary heater unit is turned off when the measured internal temperature ($T_{room}$) reaches the target internal temperature ($T_{target}$)+β° C. in the second mode, and the auxiliary heater unit is turned on when the measured internal temperature ($T_{room}$) reaches the target internal temperature ($T_{target}$)+α° C. in a state where the auxiliary heater unit is OFF where the α is smaller than β, wherein the β is a real number, wherein ON and OFF operations of the auxiliary heater unit are alternately repeated while the measured internal temperature (Troom) is maintained within a predetermined range in response to a condition of the measured internal temperature (Troom) and the target internal temperature (Ttarget); and implementing a fourth mode in which the main heater unit is turned on when the main-heater-unit refrigerant temperature (Trefrigerants) is 30° C. or less in the third mode, and the main heater unit is turned off when the main-heater-unit refrigerant temperature (Trefrigerants) is 40° C. or higher in a state where the main heater unit is ON, wherein ON and OFF operations of the main heater unit are alternately repeated while the main-heater-unit refrigerant temperature (Trefrigerants) is maintained within a predetermined range in response to the main-heater-unit refrigerant temperature (Trefrigerants).

10. The method of claim 9, wherein, when a relationship between the target internal temperature ($T_{target}$) and the measured internal temperature ($T_{room}$) satisfies $T_{room}=T_{target}-X$° C., where the X is between 3 and 8, based on the measured outside air temperature ($T_{outside}$) in the first mode, the auxiliary heater unit is turned on.

11. The method of claim 9, wherein the fourth mode is implemented in which the main heater unit is turned on when the main-heater-unit refrigerant temperature ($T_{refrigerants}$) is 30° C. or less in the third mode, and the main heater unit is turned off when the main-heater-unit refrigerant temperature ($T_{refrigerants}$) is 40° C. or higher in the state where the main heater unit is ON.

* * * * *